United States Patent
May et al.

(10) Patent No.: US 10,239,446 B2
(45) Date of Patent: Mar. 26, 2019

(54) VEHICLE SENSING SYSTEM USING DAISY CHAIN OF SENSORS

(71) Applicant: MAGNA ELECTRONICS INC., Auburn Hills, MI (US)

(72) Inventors: Benjamin May, Lübs (DE); Joern Ihlenburg, Berlin (DE); Boris Shulkin, West Bloomfield, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/647,339

(22) Filed: Jul. 12, 2017

(65) Prior Publication Data

US 2018/0015875 A1 Jan. 18, 2018

Related U.S. Application Data

(60) Provisional application No. 62/361,586, filed on Jul. 13, 2016.

(51) Int. Cl.
| | |
|---|---|
| *B60Q 1/00* | (2006.01) |
| *B60Q 1/52* | (2006.01) |
| *B60Q 9/00* | (2006.01) |
| *G01S 13/93* | (2006.01) |
| *G01S 15/93* | (2006.01) |
| *G01S 13/87* | (2006.01) |
| *G01S 15/87* | (2006.01) |

(52) U.S. Cl.
CPC .............. *B60Q 1/525* (2013.01); *B60Q 9/008* (2013.01); *G01S 13/87* (2013.01); *G01S 13/931* (2013.01); *G01S 15/87* (2013.01); *G01S 15/931* (2013.01); *G01S 2013/9364* (2013.01); *G01S 2013/9375* (2013.01); *G01S 2013/9378* (2013.01); *G01S 2015/937* (2013.01)

(58) Field of Classification Search
None
See application file for complete search history.

(56) References Cited

U.S. PATENT DOCUMENTS

| | | | |
|---|---|---|---|
| 5,949,331 A | 9/1999 | Schofield et al. | |
| 6,400,308 B1 * | 6/2002 | Bell | B60Q 1/0023 340/901 |

(Continued)

FOREIGN PATENT DOCUMENTS

| | | |
|---|---|---|
| WO | 2011090484 A1 | 7/2011 |
| WO | 2018007995 A1 | 1/2018 |

*Primary Examiner* — Jules B Lieu
(74) *Attorney, Agent, or Firm* — Honigman LLP

(57) ABSTRACT

A sensing system for a vehicle includes a plurality of sensors disposed at the vehicle. The plurality of sensors includes individual sensors connected to a vehicle network using a daisy chain topology. A control determines an address of the sensors and calibrates the sensors. The control, responsive to determination that an individual sensor is not the last sensor of a daisy chain of sensors, adjusts the internal electrical configuration to provide an open connection for another sensor. The control, responsive to determination that an individual sensor is the last sensor of the daisy chain of sensors, adjusts the internal electrical configuration to provide a termination configuration. The control, responsive to the outputs of the sensors, determines the presence of one or more objects exterior the vehicle and within the field of sensing of at least one of the sensors.

19 Claims, 6 Drawing Sheets

Standard CAN network topology

(56) References Cited

U.S. PATENT DOCUMENTS

| | | |
|---|---|---|
| 6,587,186 B2 | 7/2003 | Bamji et al. |
| 6,674,895 B2 | 1/2004 | Rafii et al. |
| 6,678,039 B2 | 1/2004 | Charbon |
| 6,690,354 B2 | 2/2004 | Sze |
| 6,710,770 B2 | 3/2004 | Tomasi et al. |
| 6,825,455 B1 | 11/2004 | Schwarte |
| 6,876,775 B2 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 8,013,780 B2 | 9/2011 | Lynam |
| 8,027,029 B2 | 9/2011 | Lu et al. |
| 9,036,026 B2 | 5/2015 | Dellantoni et al. |
| 9,146,898 B2 | 9/2015 | Ihlenburg et al. |
| 9,508,014 B2 | 11/2016 | Lu et al. |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 2004/0030462 A1* | 2/2004 | Magner ............... B60R 25/2009 701/2 |
| 2008/0243342 A1* | 10/2008 | Breed ................ B60R 21/0132 701/45 |
| 2010/0245066 A1 | 9/2010 | Sarioglu et al. |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0059236 A1 | 3/2018 | Wodrich et al. |
| 2018/0067194 A1 | 3/2018 | Wodrich et al. |

* cited by examiner

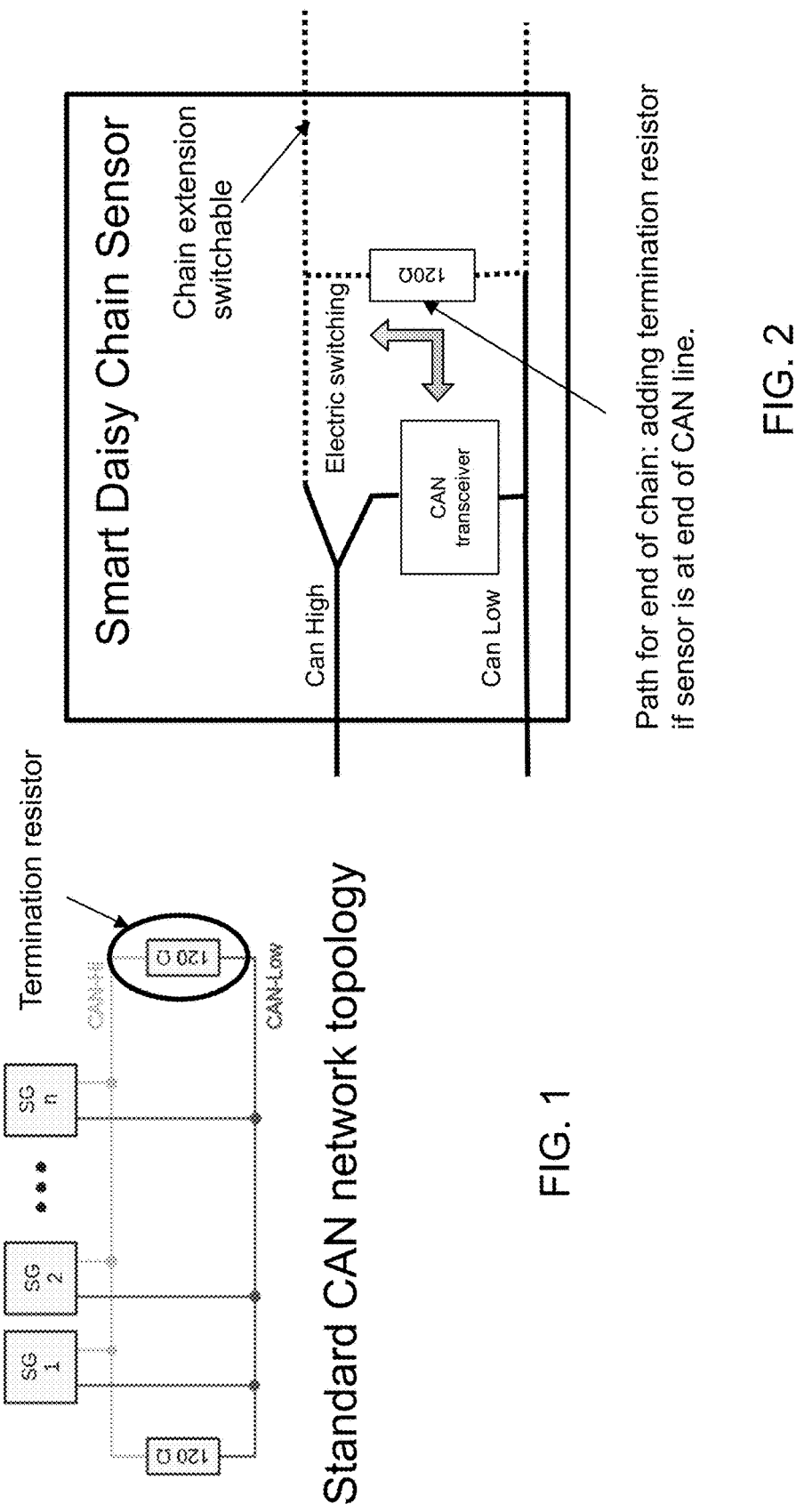

VEHICLE SENSING SYSTEM USING DAISY CHAIN OF SENSORS

CROSS REFERENCE TO RELATED APPLICATION

The present application claims the filing benefits of U.S. provisional application Ser. No. 62/361,586, filed Jul. 13, 2016, which is hereby incorporated herein by reference in its entirety.

FIELD OF THE INVENTION

The present invention relates generally to a vehicle sensing system for a vehicle and, more particularly, to a vehicle sensing system that utilizes a plurality of sensors at a vehicle to provide a field of sensing around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

SUMMARY OF THE INVENTION

The present invention provides a driver assistance system or sensing system for a vehicle that utilizes one or more sensors (such as ultrasonic sensors or radar sensors or the like) disposed at the vehicle to sense respective regions exterior of the vehicle, with the sensors or sensor units comprising a plurality of sensors disposed at the vehicle. Outputs of the sensors are communicated to a control and, responsive to the outputs of the sensor unit, the control determines the presence of one or more objects exterior the vehicle and within the field of sensing of at least one of the sensors.

The system of the present invention solves concerns with respect to indistinguishable CAN or CAN FD knots or nodes in a vehicle network, which could be used for sensor chains or all other types of CAN knots, such as actuators or control devices. In order to solve such concerns, a termination and calibration process is provided.

These and other objects, advantages, purposes and features of the present invention will become apparent upon review of the following specification in conjunction with the drawings.

BRIEF DESCRIPTION OF THE DRAWINGS

FIG. 1 is a diagram showing a standard CAN network topology;

FIG. 2 is a diagram showing a daisy chain sensor configuration in accordance with the present invention;

DESCRIPTION OF THE PREFERRED EMBODIMENTS

A vehicle sensing system, such as a driving assist system, object detection system, parking assist system and/or alert system, operates to capture sensing data exterior of the vehicle and may process the captured data to detect objects at or near the vehicle and in the predicted path of the vehicle, such as to assist a driver of the vehicle in maneuvering the vehicle in a forward or rearward direction or to assist the driver in parking the vehicle in a parking space. The system includes a processor that is operable to receive sensing data from multiple sensors and to provide an output to a control that, responsive to the output, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle).

Figure 7:
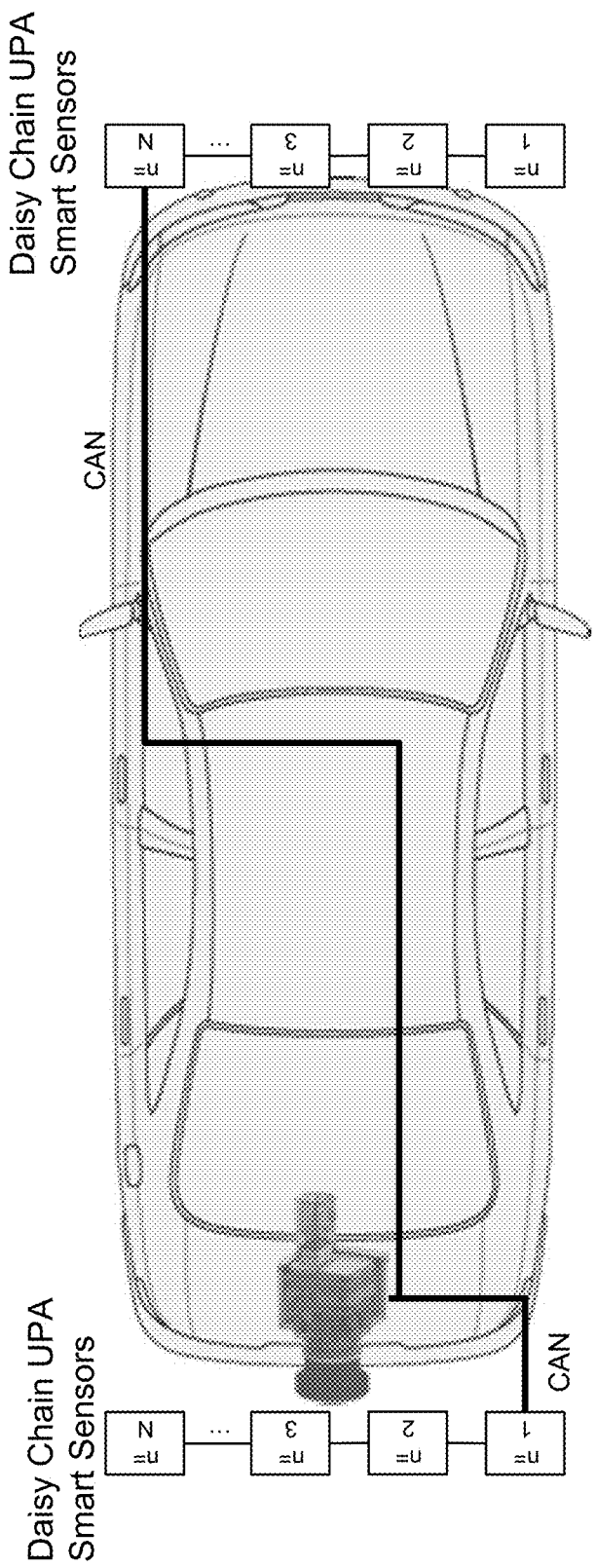
FIG. 7 is a plan view of a vehicle with daisy chains of sensors in accordance with the present invention.

A vehicle network (such as a CAN bus or the like) uses network ID to receive and send messages in the network. The CAN (controller area network) database and message is predefined and pre-shared with suppliers to configure the vehicle network. Indistinguishable components need to be preconfigured. The system of the present invention avoids the need for preconfiguring indistinguishable components. A use case is, for example, CAN or CAN FD based automotive sensor chains, such as for ultrasonic park assist (UPA) sensors, Radar sensors and/or the like. The sensor knots in a CAN chain may also be of different (preconfigured and indistinguishable) types, such as control devices, output devices and actuators. An exemplary park assist system using the sensors and daisy chain topology of the present invention is shown in FIG. 7.

Figure 3:
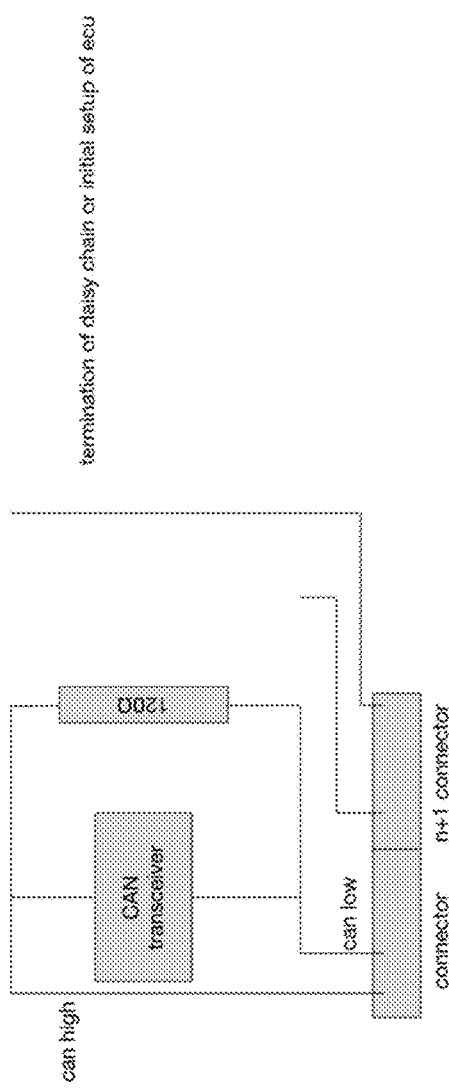
FIG. 3 is a diagram showing an initial mounting of a sensor.
Figure 4:
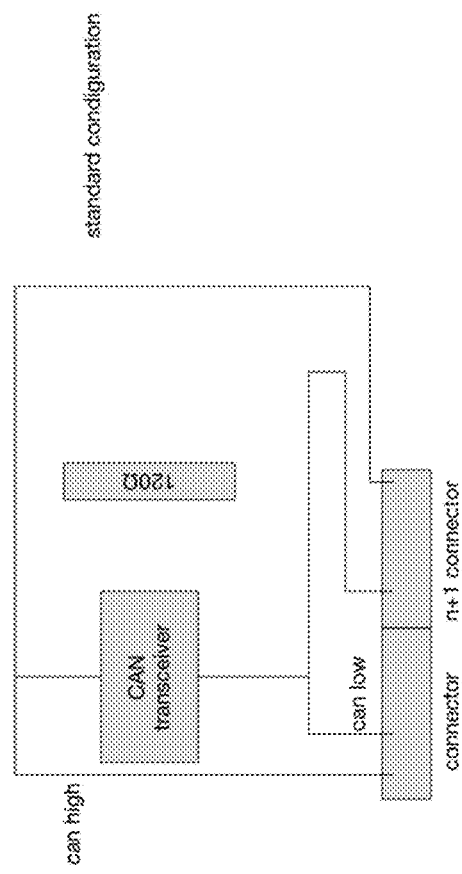
FIG. 4 is a diagram showing reconfiguration of the connections based on sensor calibration.

As shown in FIG. 1, a standard CAN network topology has each sensor connected to a CAN-Hi line and a CAN-Low line. A smart daisy chain sensor of the present invention is shown in FIG. 2. Switch configurations for an initial mounting of a sensor and for electrical reconfiguration based on sensor calibration are shown in FIGS. 3 and 4.

Figure 5:
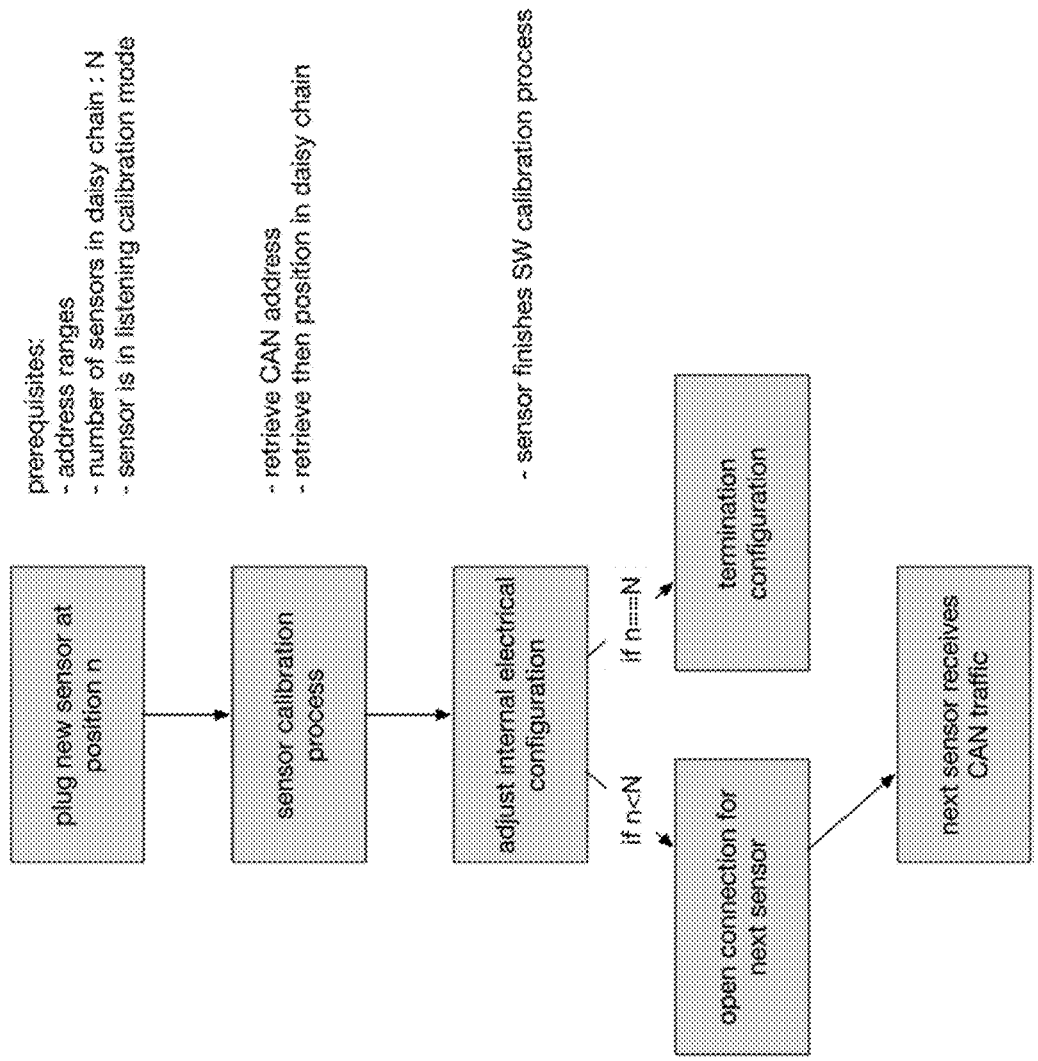
FIG. 5 is a block diagram showing calibration of a sensor in accordance with the present invention.

As shown in FIG. 5, a chain extension mechanism (where one or more sensors may be added to the chain of sensors at the vehicle and along and in communication with the communication network) is provided that uses an internal diagnostic routine that calibrates the sensor or sensors. Replacement of one or more sensors works in the same manner. The diagnostic trouble codes (DTCs) can be defined to identify sensor features in the chain.

Figure 6:
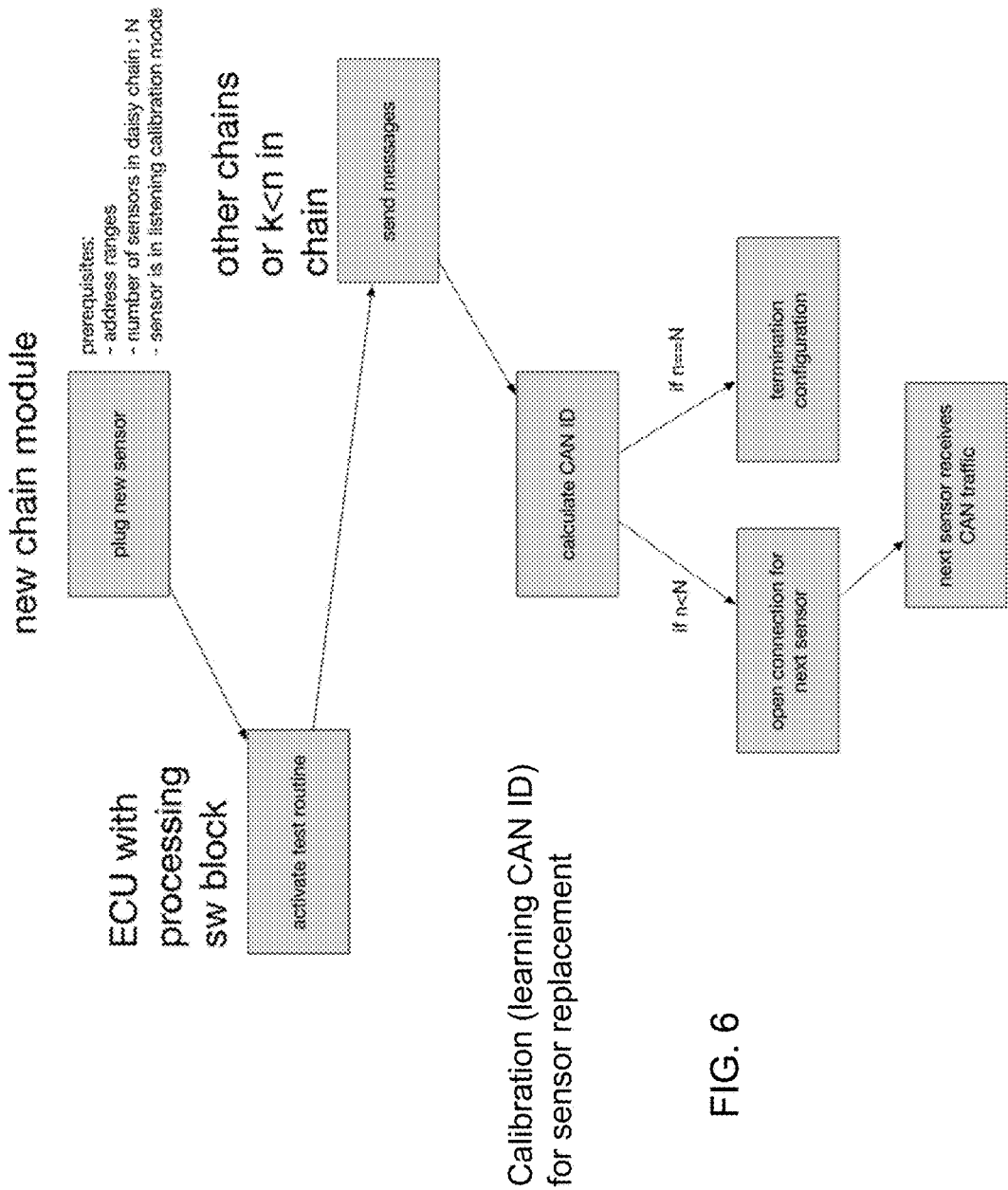
FIG. 6 is a block diagram showing calibration of a sensor in the daisy chain of sensors of the present invention.

Another chain extension mechanism is shown in FIG. 6, where calibration (learning the CAN ID) for sensor replacement is provided.

Figure 8:
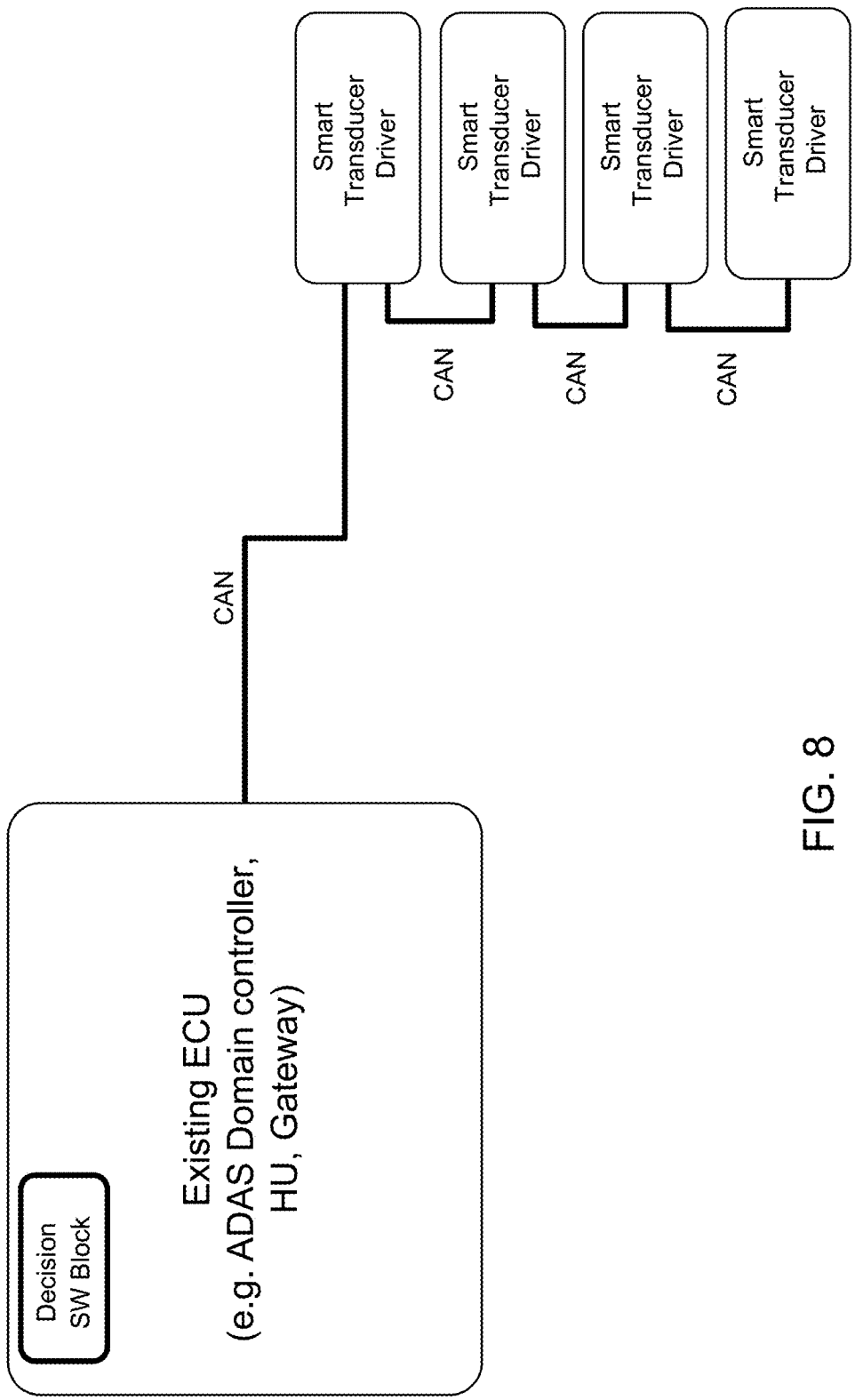
FIG. 8 is a diagram showing application of the daisy chain of sensors for an ultrasonic park assist (UPA) system.

A CAN-based smart sensor system (such as for a UPA system of a vehicle) of the present invention is shown in FIG. 8. The system provides for removal of an existing UPA ECU and includes a daisy chain of CAN-based smart sensors. Optionally, SW decision blocks in other ECUs may be moved based on the system of FIG. 8. Although shown as applicable for a UPA system, the sensor system is applicable to other sensing systems as well.

Although described as having a plurality of ultrasonic sensors or sensor units disposed at the vehicle, the system of the present invention may utilize any suitable type of sensors, such as radar sensors, Lidar sensors, or the like. The means to adapt for the vehicle body response may be adjusted according to the type of sensors implemented in the sensing system.

Thus, the sensing system of the present invention is operable to calibrate a plurality of sensors for a sensing system for a vehicle. The plurality of sensors are configured to be disposed at a vehicle and electrically connected to a communication network of the vehicle, and the control is in communication with the communication network of the vehicle and is operable to process data sensed by the sensors when the sensors are connected to the communication network of the vehicle. When the system is initially installed or set up, an input may be provided to the control that is indicative of the number of sensors that are to be connected to the communication network as part of a daisy chain of sensors. When the individual sensors are connected to the communication network of the vehicle, the control may determine that the given connected sensor is connected to the communication network and calibrates the given connected sensor. The control may also determine an address or location of the sensor at the communication network and vehicle. The control, responsive to the known number of sensors to be connected and to the determined address of each sensor, determines whether an individual connected sensor is the last sensor of the daisy chain of sensors. If the individual sensor is determined to not be the last sensor of the daisy chain of sensors, the control adjusts the internal electrical configuration to provide an open connection for another sensor (and the control may search for another sensor connected to the communication network). If the individual sensor is determined to be the last sensor of the daisy chain of sensors, the control adjusts the internal electrical configuration to provide a termination configuration.

The sensing system of the present invention may utilize aspects of the systems described in U.S. Pat. Nos. 9,599,702; 9,575,160; 9,508,014; 8,013,780 and/or 5,949,331 and/or International Publication No. WO 2011/090484 and/or U.S. Publication No. US-2010-0245066 and/or U.S. patent application Ser. No. 15/619,627, filed Jun. 12, 2017 and published Dec. 14, 2017 as U.S. Publication No. US-2017-0356994, Ser. No. 15/584,265, filed May 2, 2017 and published Nov. 2, 2017 as U.S. Publication No. US-2017-0315231, Ser. No. 15/467,247, filed Mar. 23, 2017 and published Sep. 28, 2017 as U.S. Publication No. US-2017-0276788, Ser. No. 15/446,220, filed Mar. 1, 2017 and published Sep. 7, 2017 as U.S. Publication No. US-2017-0254873, Ser. No. 15/420,238, filed Jan. 31, 2017 and published Aug. 3, 2017 as U.S. Publication No. US-2017-0222311, and/or International PCT Application No. PCT/162017/054120, filed Jul. 7, 2017 and published Jan. 11, 2018 as International Publication No. WO 2018/007995, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A sensing system for a vehicle, said sensing system comprising:
   a plurality of sensors disposed at a vehicle;
   wherein said plurality of sensors comprises individual sensors connected to a vehicle network using a daisy chain topology;
   a control, wherein outputs of said sensors are communicated to said control, and wherein said control, responsive to said outputs of said sensors, determines the presence of one or more objects exterior the vehicle and within the field of sensing of at least one of said sensors; and
   wherein said control is operable to solve concerns with respect to indistinguishable nodes of the vehicle network.

2. The sensing system of claim 1, wherein said plurality of sensors comprises a plurality of ultrasonic sensors.

3. The sensing system of claim 1, wherein said plurality of sensors comprises a plurality of radar sensors.

4. The sensing system of claim 1, wherein said sensors are part of a sensing system capable of providing short range driving assist system functions.

5. The sensing system of claim 1, wherein said control solves such concerns via a termination and calibration process.

6. The sensing system of claim 5, wherein said control receives an input of the total number of sensors in a chain of sensors, and wherein, responsive to determination that a given sensor is the last sensor in the chain of sensors, said system uses a termination configuration at that sensor.

7. The sensing system of claim 6, wherein, responsive to determination that a given sensor is not the last sensor in the chain of sensors, said system provides an open connection for another sensor in the chain of sensors.

8. The sensing system of claim 1, wherein said sensing system provides sensing for at least one of automated parking, blind spot detection, cross traffic alert, lane change and merge aid, automatic emergency braking, pedestrian detection, turn assist, and intersection collision mitigation.

9. A method for calibrating a plurality of sensors for a sensing system for a vehicle, said method comprising:
   providing a plurality of sensors configured to be disposed at a vehicle and electrically connected to a communication network of the vehicle;
   providing a control in communication with the communication network of the vehicle, wherein the control is operable to process data sensed by the sensors when the sensors are connected to the communication network of the vehicle;
   providing an input to the control that is indicative of the number of sensors that are to be connected to the communication network as part of a daisy chain of sensors;
   connecting the sensors to the communication network of the vehicle;
   responsive to determination that a given connected sensor is connected to the communication network, calibrating the given connected sensor;
   determining via the control whether a given connected sensor is the last sensor of the daisy chain of sensors;
   responsive to determination that a given connected sensor is not the last sensor of the daisy chain of sensors, adjusting the internal electrical configuration to provide an open connection for another sensor; and
   responsive to determination that a given connected sensor is the last sensor of the daisy chain of sensors, adjusting the internal electrical configuration to provide a termination configuration.

10. The method of claim 9, wherein determining whether a given connected sensor is the last sensor of the daisy chain of sensors comprises determining an address of the given connected sensor at the communication network.

11. The method of claim 10, comprising calibrating the sensors based at least in part on the address of the given connector sensor at the communication network.

12. The method of claim 9, wherein, responsive to determination that a given connected sensor is not the last sensor of the daisy chain of sensors, the control searches for another sensor that is being connected to the communication network.

13. The method of claim 9, wherein the communication network comprises a controller area network of the vehicle.

14. The method of claim 9, wherein, responsive to determination that a given sensor is connected to the communication network, activating a calibration process to calibrate that sensor.

15. The method of claim 9, wherein the plurality of sensors comprises a plurality of ultrasonic sensors.

16. The method of claim 9, wherein the plurality of sensors comprises a plurality of radar sensors.

17. The method of claim 9, wherein the control processes data sensed by the sensors for at least one of automated parking, blind spot detection, cross traffic alert, lane change and merge aid, automatic emergency braking, pedestrian detection, turn assist, and intersection collision mitigation.

18. A sensing system for a vehicle, said sensing system comprising:

a plurality of sensors disposed at a vehicle and electrically connected to a communication network of the vehicle;

a control in communication with the communication network of the vehicle, wherein said control is operable to receive data sensed by said sensors via the communication network and to process the data sensed by said sensors;

wherein said control receives an input that is indicative of the number of sensors that are connected to the communication network as part of a daisy chain of sensors;

wherein said control is operable to determine address of the individual sensors at the communication network and to individually calibrate the individual sensors based at least in part on the determined address;

responsive at least in part to the input, said control determines whether an individual sensor is the last sensor of said daisy chain of sensors;

responsive to determination that an individual sensor is not the last sensor of said daisy chain of sensors, said control adjusts the internal electrical configuration to provide an open connection for another sensor;

responsive to determination that an individual sensor is the last sensor of said daisy chain of sensors, said control adjusts the internal electrical configuration to provide a termination configuration; and wherein, with said sensors calibrated, said control processes data sensed by said sensors for at least one of automated parking, blind spot detection, cross traffic alert, lane change and merge aid, automatic emergency braking, pedestrian detection, turn assist, and intersection collision mitigation.

19. The sensing system of claim 18, wherein said plurality of sensors is selected from the group consisting of (i) a plurality of ultrasonic sensors and (ii) a plurality of radar sensors.

* * * * *